United States Patent
Tubbs

Patent Number: 5,263,820
Date of Patent: Nov. 23, 1993

[54] COOLED AEROFOIL BLADE FOR VANE FOR A GAS TURBINE ENGINE

[75] Inventor: Henry Tubbs, Derby, England

[73] Assignee: Rolls-Royce, London, England

[21] Appl. No.: 906,252

[22] Filed: Sep. 4, 1986

[30] Foreign Application Priority Data

Oct. 18, 1985 [GB] United Kingdom ............... 8525771

[51] Int. Cl.⁵ ............................................ B63H 1/14
[52] U.S. Cl. ................................ 416/97 R; 60/266; 415/115; 416/96 R
[58] Field of Search ............... 60/266; 416/96 R, 97, 416/97 R, 96; 415/115, 114, 117, 9, 174; 29/156.811

[56] References Cited

U.S. PATENT DOCUMENTS

3,819,295  6/1974  Hauser ................... 416/96 R

FOREIGN PATENT DOCUMENTS

893706   4/1962  United Kingdom.
1366704  9/1974  United Kingdom.
1467197  3/1977  United Kingdom.
1589191  5/1981  United Kingdom.

*Primary Examiner*—Donald P. Walsh
*Attorney, Agent, or Firm*—Cushman, Darby & Cushman

[57] ABSTRACT

A cooled aerofoil blade for a gas turbine engine has a hollow trailing edge region in which bridging members interconnect the convex and concave flanks of the blade. The bridging members are each provided with angled cooling passages which are in operation exposed to a cooling air flow and direct that flow onto the internal surfaces of the convex and concave flanks so as to provide impingement cooling thereof.

8 Claims, 1 Drawing Sheet

COOLED AEROFOIL BLADE FOR VANE FOR A GAS TURBINE ENGINE

This invention relates to a cooled aerofoil blade or vane for a gas turbine engine and is particularly concerned with the cooling of the trailing edge region of such a blade or vane.

It is common practice to provide aerofoil blades or vanes destined for use in the turbines of gas turbine engines with some form of cooling in order that they are able to operate effectively in the high temperature environment of such turbines. Such cooling typically takes the form of passages within the blades or vanes which are supplied in operation with pressurised cooling air derived from the compressor of the gas turbine engine. The cooling air is directed through the passages in the blade or vane to provide convective and sometimes impingement cooling of the blade or vanes internal surfaces before being exhausted into the hot gas flow in which the blade or vane is operationally situated. Sometimes the cooling air is directed through small holes provided in the aerofoil surface of the blade or vane in order to provide film cooling of the aerofoil surface.

There is a problem however in the cooling of the trailing edge regions of turbine blades and vanes. Such trailing edge regions are usually very long and slender and this makes it difficult to provide them with internal cooling passages. Such trailing edge cooling passages have in the past been provided by slender cast or drilled discharge holes which interconnect the aerofoil trailing edge with cooling air passages within the blade or vane and which facilitate the discharge of cooling air from the blade or vane as well as providing convective cooling of the aerofoil trailing edge region. The physical form and size of the aerofoil trailing edge region means that it is difficult to arrange for the cooling air flow to provide effective convective cooling of the trailing edge region. Moreover if it is desired to provide film cooling holes in the trailing edge region, they may interfere with the internal disposition of the cooling air passages.

It is an object of the present invention to provide a cooled aerofoil blade or vane for a gas turbine engine having an aerofoil trailing edge region which is effectively cooled and to provide a method of manufacturing such a blade or vane.

According to the present invention, a cooled aerofoil blade or vane for a gas turbine engine comprises an aerofoil cross-section portion having a leading edge region, concave and convex flanks, and a trailing edge region, said trailing edge region being generally hollow adapted to be supplied, in operation, with a flow of cooling fluid, and includes at least one bridging member which interconnects said concave and convex flanks and has a plurality of passages therein, said passages being so disposed as to be exposed to said cooling fluid flow supplied to said aerofoil portion interior and to direct at least a part of said cooling fluid flow on to the interior surface of at least one of said concave and convex flanks in said trailing edge region so as to provide impingement cooling thereof.

The invention will now be described, by way of example, with reference to the accompanying drawings in which.

Figure 1:
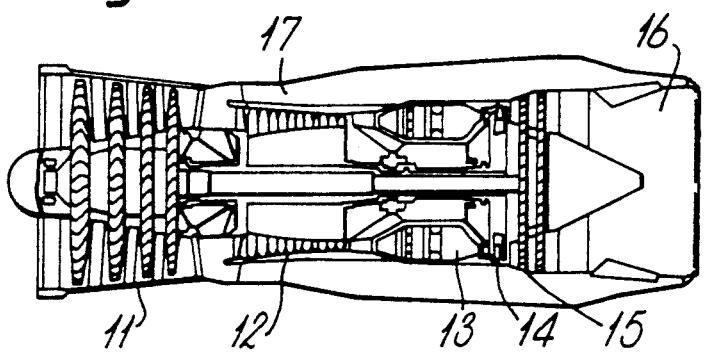
FIG. 1 is a sectioned side view of a gas turbine engine incorporating a cooled aerofoil blade in accordance with the present invention.

With reference to FIG. 1 a by-pass gas turbine engine generally indicated at 10 is of conventional construction and comprises, in axial flow series, a low pressure compressor 11, high pressure compressor 12, combustion equipment 13, a high pressure turbine 14, a low pressure turbine 15 and an exhaust nozzle 16. The engine 10 operates in the conventional manner with air which has been compressed in the low pressure compressor 11 being divided between a by-pass duct 17 and the high pressure compressor 12. Air from the high pressure compressor 12 is mixed with fuel in the combustion equipment 13 and the mixture combusted. The resultant exhaust products expand through the high pressure turbine 14, which is drivingly connected to the high pressure compressor 12 and the low pressure turbine 15 which is drivingly connected to the low pressure compressor 11 before being mixed with air from the by-pass duct 17 and the mixture exhausted to atmosphere through the exhaust nozzle 16.

Figure 2:
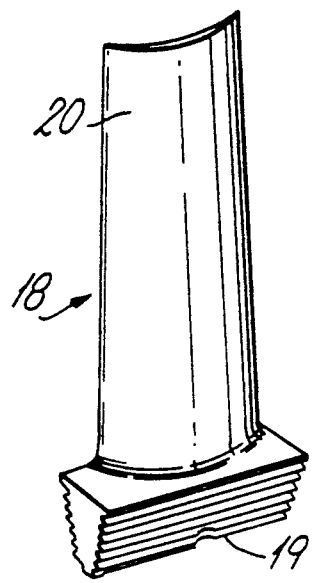
FIG. 2 is a perspective view of a cooled aerofoil blade in accordance with the present invention.
Figure 3:
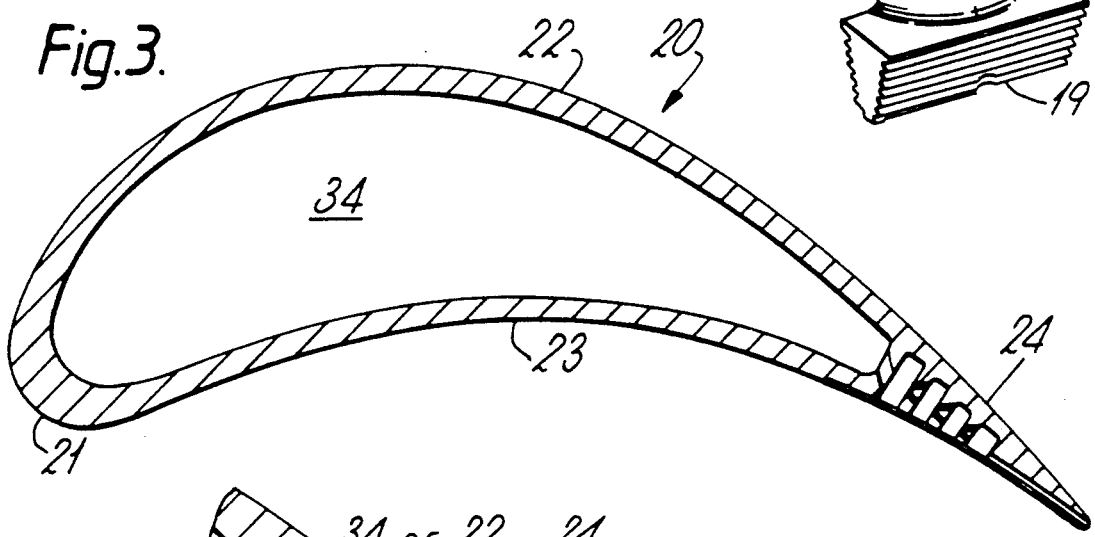
FIG. 3 is a sectional view of the aerofoil cross-section portion of the cooled aerofoil blade shown in FIG. 2.

The high pressure turbine 14 includes an annular array of cooled aerofoil blades, one of which 18 can be seen in FIG. 2. The aerofoil blade 18 comprises a fir-tree cross-section root 19 which facilitates its attachment in a correspondingly shaped recess in the periphery of a rotary disc (not shown), and an aerofoil cross-section portion 20. The aerofoil cross-section portion 20, which can be seen more clearly in FIG. 3 is generally hollow and includes a leading edge region 21, convex and concave flanks 22 and 23 respectively and a trailing edge region 24. The trailing edge region 24, which can be seen in more detail in FIG. 4, comprises four spaced apart generally parallel bridging members 25,26,27 and 28, each of which extends along substantially the whole length of the aerofoil cross-section portion 20 and interconnects the convex and concave aerofoil flanks 22 and 23 respectively. The first bridging member 25 i.e. the one which is nearest to the leading edge region 21, is integral with both the convex and concave flanks 22 and 23 respectively. However the remaining bridging members 26,27 and 28 are integral only with the convex flank 22. The concave flank 23 in the trailing edge region 24 is constituted by an appropriately configured length-wise extending sheet member 29 which is attached by brazing or other suitable form of bonding, to the remainder of aerofoil cross-section portion 20. The sheet member 29, the bridging members 25,26,27 and 28 and the convex flank 22 in the trailing edge region 24 thus define four length-wise extending chambers 30,31,32 and 33.

Figure 4:
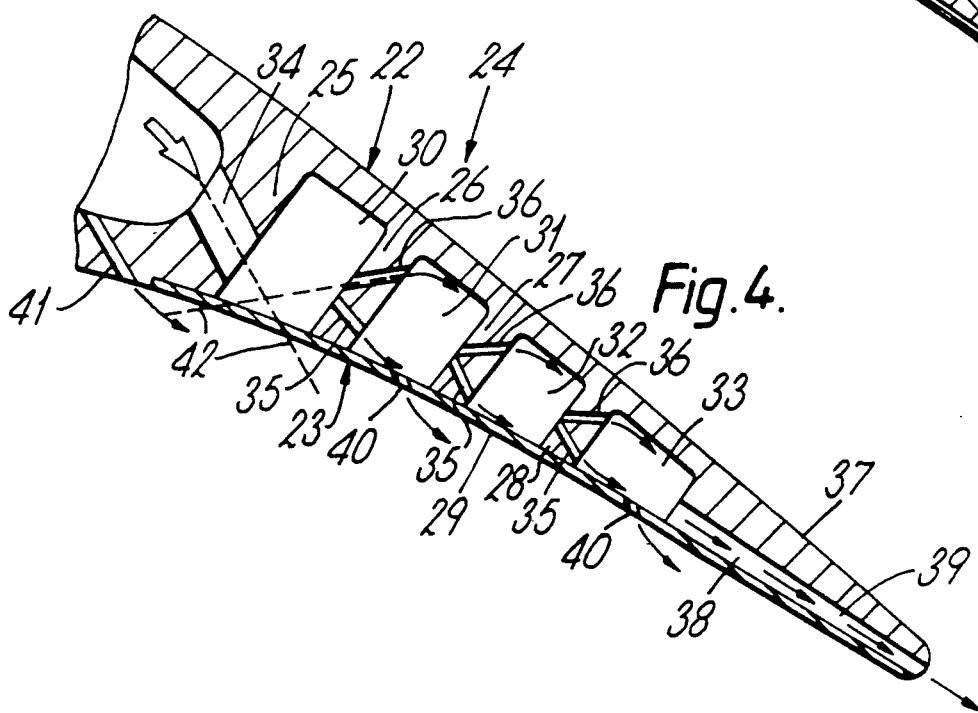
FIG. 4 is a view on an enlarged scale of a portion of the view shown in FIG. 3.

In operation, the interior 34 of the aerofoil cross-section 20 is supplied with a flow of cooling air derived from the gas turbine engine low pressure compressor 11. The first bridging member 25 has a plurality of angled passages 34 in it, one of which can be seen in FIG. 4, which direct some of that cooling air into the chamber 30. The passages 34 direct the cooling air on to a portion of the concave flank 23 in order to provide impingement cooling thereof. Passages 35 and 36 in each of the remaining bridging members 26,27 and 28 ensure that the cooling air in the chamber 30 sequentially flows into the remaining chamber 31,32 and 33. The passages 35 and 36 are angled so that as cooling air emerges from them, it provides impingement cooling of each of the convex and concave flanks 22 and 23. Thus passages 35 and 36 in each of the bridging members 26,27 and 28 are arranged in pairs which in plan form are of generally V-shaped configuration as can be seen in FIG. 4 in order to achieve the described impingement cooling of the convex and concave flanks 22 and 23 in the trailing edge region 24. However, such a paired arrangement is not essential to the effective operation of the present invention. Thus the passages 35 and 36 could be so located that they radially alternate with respect to the axis of rotation of the high pressure turbine 14 so that the passages 35 and 36 direct cooling air on to the convex and concave flanks 22 and 23 respectively.

The aerofoil trailing edge 37 is provided with a series of grooves 38, one of which can be seen in FIG. 4, which cooperate with the sheet member 29 to define a plurality of passages 39 interconnecting the rearmost chamber 33 with the aerofoil exterior. The passages 39 provide for the exhaustion of cooling air from the aerofoil portion 20 as well as facilitating convective cooling of the trailing edge.

It will be seen therefore that the chambers 30,31,32 and 33 and their communicating angled passages 35 and 36 together with the passage 34 facilitate the impingement cooling of a large proportion of the convex and concave flanks 22 and 23 in the aerofoil trailing edge region 24. It is sometimes desirable however to provide film cooling in the trailing edge region 24. This can be easily achieved by the provision of cooling air passages 40 in the sheet 29 which provide for the exhaustion of some cooling air from the chambers 31 and 33 to the exterior surface of the convex flank 23. Indeed passages 41 may, if desired, be provided in the convex flank 23 forward of the first bridging member 25 to provide a film cooling air flow from the aerofoil interior to the sheet 29.

The trailing edge region 24 construction described above may be readily constructed by first of all casting the aerofoil section 20 as described above so that the bridging members 26,27 and 28 are in the form of integral ribs which are readily accessible. This accessibility of the ribs ensures that the passages 34,35 and 36 are easily provided by drilling operations. Thus the interrupted lines 42 in FIG. 4 indicating the axes of the passages 34 and 36 demonstrate how the angular dispositions of the passages 34,35 and 36 facilitate their formation by conventional drilling techniques. When the passages 34,35 and 36 have been formed by drilling, the plate 29 is fixed in position by brazing or other suitable method of bonding as described earlier.

It will be seen therefore that the present invention provides an effective system for cooling the trailing edge region 24 of the turbine blade 18 which is comparatively simple and inexpensive to construct. It will be apparent to those skilled in the art that the present invention is not limited to the particular embodiment described and that other forms of the present invention may be envisaged. Thus for instance although the present invention has been described with respect to a rotary turbine blade 18, it is equally applicable to stator vane construction. Moreover although the aerofoil blade 18 has been described as having an interior 34 which is generally devoid of structure, it will be appreciated that suitable structure, containing cooling air passages, could if so desired, be provided within the interior 34. Such cooling air passages could, for instance, be so arranged as to provide impingement cooling of the internal surfaces of the aerofoil blade 18.

I claim:

1. A cooled aerofoil blade or vane for gas turbine engine comprising an aerofoil cross-section portion having a leading edge region, concave and convex flanks, and a trailing edge region, said trailing edge region being generally hollow and adapted to be supplied, in operation, with a flow of cooling fluid, and including a plurality of bridging members each extending between said concave and convex flanks and interconnecting said concave and convex flanks, each bridging member having a plurality of passages therein, said passages being so disposed as to be exposed to said cooling fluid flow supplied to said aerofoil portion interior and to direct at least a part of said cooling fluid flow onto the interior surface of at least one of said concave and convex flanks in said trailing edge region so as to provide impingement cooling thereof, each said bridging member extending generally longitudinally of said aerofoil cross-section portion; said plurality of passages in each said bridging member being so disposed that some of said passages direct cooling fluid onto said concave flank and the remainder direct cooling fluid onto said convex flank in said trailing edge region, said bridging members being disposed so as to cooperate with each other and said concave and convex flanks to define at least two chambers in said trailing edge region, which chambers are in cooling fluid flow communication with each other.

2. A method of manufacturing a cooled aerofoil blade or vane for gas turbine engine of the type having an aerofoil cross-section portion having a leading edge region, concave and convex flanks and a trailing edge region, said trailing edge region being generally hollow and adapted to be supplied, in operation, with a flow of cooling fluid and including at least one bridging member which interconnects said concave and convex flanks and having a plurality of passages therein, said passages being so disposed as to be exposed to said cooling fluid flow supplied to said aerofoil portion interior and to direct at least part of said cooling fluid flow onto the interior surface of at least one of said concave and convex flanks in said trailing edge region so as to provide impingement cooling thereof, and wherein at least in said trailing edge region, one of said convex and concave flanks is formed separately from the remainder of said blade or vane so that said at least one bridging member is accessible for the machining of said cooling fluid passages therein, and the method comprising the steps of machining of said cooling fluid passages in said at least one bridging member and subsequently bonding said separate flank to the remainder of said blade or vane.

3. A cooled aerofoil blade or vane as claimed in claim 1 wherein at least one of said chambers is in communication with the exterior of said aerofoil portion to facilitate the exhaustion of said cooling fluid from said blade or vane.

4. A cooled aerofoil blade or vane as claimed in claim 3 wherein said at least one chamber is in communication with the exterior of said aerofoil portion via at least one passage in the trailing edge of said aerofoil portion to provide convective cooling of said trailing edge.

5. A cooled aerofoil blade or vane as claimed in claim 1 wherein at least one of said convex and concave flanks is provided with a plurality of holes which communicate with the interior of said trailing edge region and direct at least some of the cooling fluid in operation within said region to the exterior surface of said at least one flank so as to provide film cooling thereof.

6. A cooled aerofoil blade or vane as claimed in claim 1 wherein said at least one bridging member is integral with one of said convex and concave flanks in said trailing edge region.

7. A cooled aerofoil blade or vane as claimed in claim 1 wherein said cooling fluid is air.

8. A method of manufacturing a cooled aerofoil blade or vane as claimed in claim 2 wherein said remainder of said blade or vane including said at least one bridging member is formed integrally by casting.

* * * * *